United States Patent [19]

Giannuzzi

[11] Patent Number: 5,039,262
[45] Date of Patent: Aug. 13, 1991

[54] SELF-DRILLING WALL ANCHOR

[76] Inventor: Louis N. Giannuzzi, 59 Dingletown Rd., Greenwich, Conn. 06830

[21] Appl. No.: 396,109

[22] Filed: Aug. 21, 1989

Related U.S. Application Data

[63] Continuation-in-part of Ser. No. 215,307, Jul. 5, 1988, which is a continuation-in-part of Ser. No. 81,016, Aug. 3, 1987, Pat. No. 4,763,456.

[51] Int. Cl.$^5$ .............................................. F16B 13/06
[52] U.S. Cl. ..................................... 411/30; 411/55; 411/178
[58] Field of Search .................. 411/44, 57, 71, 399, 411/378, 386, 387, 397, 424, 25, 33, 30, 29, 31, 55, 178

[56] References Cited

U.S. PATENT DOCUMENTS

| | | | |
|---|---|---|---|
| 1,138,219 | 5/1915 | Hottenroth | 411/57 |
| 1,175,665 | 3/1916 | Sweet | 411/399 |
| 2,026,686 | 1/1936 | Kirley | 411/57 |
| 3,178,991 | 4/1965 | Bisbing | 411/57 |
| 4,013,071 | 3/1977 | Rosenberg | 411/397 |
| 4,799,637 | 1/1989 | Fahringer | 411/400 |
| 4,934,885 | 6/1990 | Woods et al. | 411/57 |

Primary Examiner—Michael Safavi
Attorney, Agent, or Firm—Michael Ebert

[57] ABSTRACT

A self-drilling plastic anchor installable in a wall by means of a screwdriver, the anchor being adapted to receive a threaded fastener that serves to hold a fixture or other object against the wall. The anchor includes an externally-threaded shank section having an enlarged head that is engageable by the screwdriver and a cavity to receive the fastener. Extending from the lower end of the shank section is a drill section that terminates in a point that lies on the longitudinal axis of the anchor. When the anchor is applied to the wall, the point penetrates its surface, so that the anchor may then be turned by the screwdriver about the point. The drill section is formed by a pair of cutting blades on opposite sides of the anchor axis and a pair of guide blades, each angled relative to a respective cutting blade. When the anchor is turned in, the cutting blades guided by the guide blades proceed to bore a hole in the wall, and when the shank section enters the hole, its bank is tapped by the threading of the shank section until the head thereof engages the surface of the wall to complete the installation. The fastener may then be screwed into the cavity of the shank section. The undersurface of the head has ratchet teeth formed therein which when the head engages the wall surface, the teeth grip this surface to resist turning out of the anchor.

17 Claims, 2 Drawing Sheets

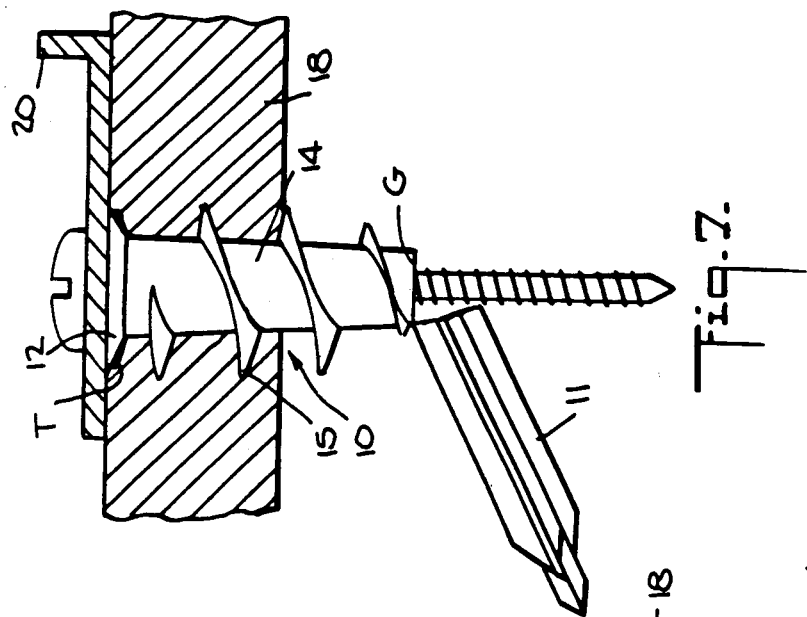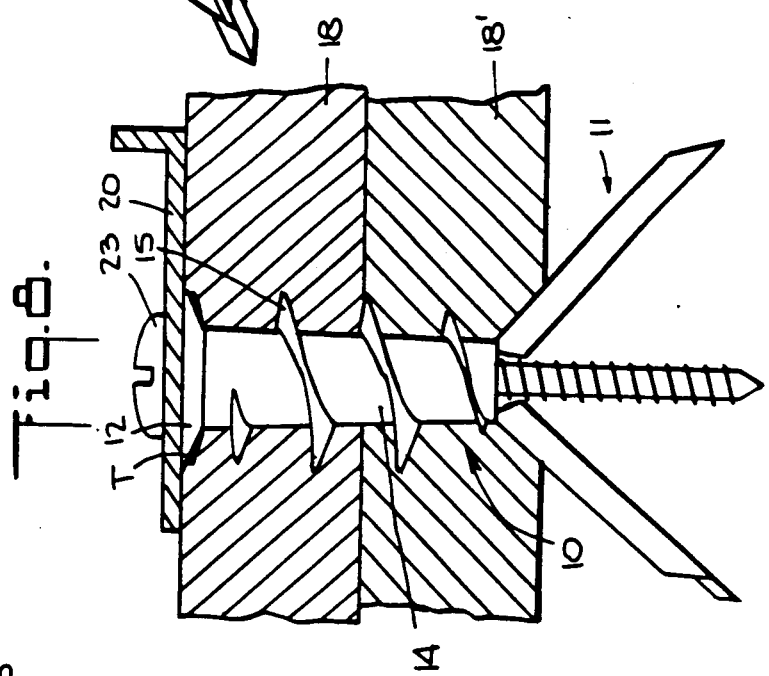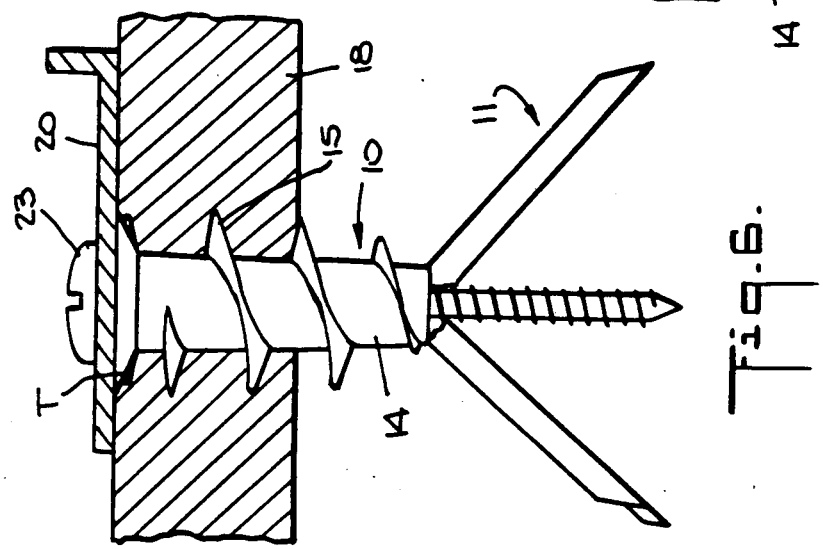

SELF-DRILLING WALL ANCHOR

RELATED APPLICATION

This application is a continuation-in-part of my copending application Ser. No. 215,307, filed July 5, 1988, entitled "Roof Anchor and Stress Plate Assembly," which in turn is a continuation-in-part of an earlier application Ser. No. No. 081,016, filed Aug. 3, 1987 having the same title (now U.S. Pat. No. 4,763,456). The entire disclosures of these related cases are incorporated herein by reference.

BACKGROUND OF INVENTION

1. Field of Invention

This invention relates generally to a plastic anchor which when installed in a hole drilled in a wall is adapted to receive a threaded fastener that serves to hold a fixture or other object against the wall, and more particularly to a self-drilling anchor of this type which dispenses with the need for any tool other than a screwdriver to install the anchor.

2. Status of The Prior Art

In order to mount brackets, fixtures and other objects provided with mounting holes against the outer surface of a wall formed of plasterboard, sheetrock, fiberboard or any other material employed in hollow wall construction, the common practice is to use a hollow anchor for this purpose. The conventional hollow anchor is formed of metal such as zinc or of plastic such as PVC, which when hammered into and wedged within a hole pre-drilled in the wall, is then adapted to receive a threaded fastener or mounting screw that goes through the mounting hole in the object and turns into the hollow of the anchor.

The required length of the mounting screw depends on the thickness of the object to be mounted. Thus if the object to be mounted is a thin metal bracket, a screw of smaller length is required than if the object is a thick board, for this dictates a longer screw.

The installation of a conventional anchor entails three distinct operations, the first and most critical step being the drilling of a hole in the wall, for the diameter of this hole must be appropriate to that of the anchor. Should an oversize hole be drilled, then in the next step when the anchor is hammered into the hole, the anchor will not wedge firmly therein but will be somewhat loose. As a consequence, it will not be possible to carry out the third step.

In the third step, one must turn a threaded fastener into the hollow of the anchor, and in doing so tap the anchor. But if the anchor is somewhat loose in the wall hole, this will cause the anchor to turn as the fastener is turned, and the fastener will therefore not be able to thread its way into the anchor.

There is also a possible fourth step that must be taken into account; for should a need arise to remove an object mounted on the wall or replace it with another object, then one must first unscrew the fastener from the anchor lodged in the wall. However, if when an unscrewing torque is applied to the fastener, this torque causes the anchor as well as the fastener to turn, then it will not be possible to withdraw the fastener from the anchor. The need therefore exists for an anchor which, after being lodged in a hole drilled in the wall, will resist being turned counterclockwise and thereby make it possible to unscrew a threaded fastener from the installed anchor.

The installation of a conventional hollow anchor requires three tools: a drill provided with a drill bit having a diameter appropriate to that of the anchor; a hammer to drive the anchor in the hole drilled in the wall; and a screwdriver to turn the threaded fastener into the anchor or to later remove it from the anchor.

Though a typical householder or other non-professional possesses a hammer and a screwdriver, he may lack a drill. But even if he has a drill, he may not have a drill bit of the appropriate diameter for the anchor to be installed. Yet there are distinct advantages to be gained by using hollow anchors to mount objects against a wall, rather than screws, nails or other fasteners which require no drilling but which have relatively poor holding power, particularly in walls made of friable materials. Nevertheless, the need for drilling has to a significant degree heretofore discouraged the use of hollow anchors by non-professionals.

Though hollow wall anchors are used on a large scale by professional installers, the need to drill holes and then hammer the anchors into the holes is a practical drawback, for these operations are time consuming and hence impose distinct limits on the number of anchors that can be installed in a given period. And if anchors of different sizes must be installed, then the installer must change the drill bit when switching from one anchor size to another, and this, too, consumes time and reduces the productivity of the installer.

To overcome these drawbacks, the 1986 patent to Ernst et al., U.S. Pat. No. 4,601,625, discloses an anchor for drywall that has an externally-threaded cylindrical section adapted to receive a fastener, and an unthreaded drilling section. This anchor is installable using only a hand-powered screwdriver for this purpose, thereby dispensing with the need for a drill and a hammer. At the upper end of the anchor is a low profile flange or head which allows the anchor to be installed flush with the drywall surface.

The Ernst et al. patent discloses an embodiment of an anchor molded of zinc, and another embodiment formed of plastic material. Both embodiments include a drill section that can be deflected laterally upon insertion of a mounting screw therethrough. This makes it possible to use a single mounting screw of moderate length in conjunction with the anchor for attaching objects of various thicknesses to the wall.

In Ernst et al., the drill section is formed by a single flat blade whose free end is notched to define a central spike and a pair of peripheral spikes on either side of the central spike, the function of the central spike, which extends beyond the peripheral spikes and therefore is the first to penetrate the surface of the drywall, is to maintain the location of the rotating drill section as a hole is drilled by the peripheral spikes. In practice, when a single blade is used to bore a hole in friable material such as drywall, the resultant drilled hole may not be perfectly round, for when this material encounters the central or guide spike, it tends to make the blade whip, as a consequence of which the drilling is shifted off center and the bored hole is oversize or elliptical.

My above-identified copending application also discloses a self-drilling anchor having an externally-threaded shank section that terminates in a drilling section having a guide tip. In contradistinction to the cylindrical, externally-threaded section in Ernst et al., the shank section of my anchor has a root which tapers toward the drill section and a threading surrounding the root formed by a series of convolutions whose crests are of essentially the same diameter along substantially the full length of the shank section. The advantage of this arrangement is that as the anchor is screwed into a wall of friable material, the pulverized material is then packed by the threading into a relatively dense mass which surrounds the shank to enhance its resistance to withdrawal from the wall.

And while the anchor disclosed in my copending application also has a flange-like head of low profile similar to that of Ernest et al. so that the installed anchor will lie flush against the surface of the wall, in both cases these self-drilling anchors when installed by being turned into a wall do not offer adequate resistance to being turned out. Yet resistance to being turned may be necessary; for when an occasion arises requiring withdrawal of the mounting screw from the anchor, in turning out the screw with a screwdriver, this action will also cause the anchor to turn out with the screw; hence the screw cannot be withdrawn from the anchor.

SUMMARY OF INVENTION

In view of the foregoing, the main object of this invention is to provide an improved self-drilling plastic anchor which is installable in a wall by means of a screwdriver, the anchor being adapted to receive a threaded fastener that serves to hold a fixture or other object against the wall, the anchor dispensing with the need for a drill, a hammer, or any tool other than a screwdriver to install the anchor.

More particularly an object of this invention is to provide an anchor of the above type having an externally-threaded shank section and a drill section extending therefrom, which when the anchor is turned into the wall, bores a round hole therein whose bank, as the shank section enters this hole, is tapped by the threading of this section.

A significant feature of the invention resides in a threaded anchor having a drill section with multiple cutting blades in which each cutting blade is associated with a guide blade to ensure that as the drill section is turned into the wall, the blades proceed to bore a hole which has a circular cross section and is not off-round or elliptical, thereby ensuring proper thread formation and maximum holding strength when the anchor is threaded into the hole.

Another important feature of the invention resides in a shank section having a head which when the anchor is installed is pressed against the surface of the wall and is provided with gripping teeth that resist turning out of the anchor. Hence when it is necessary to unscrew the threaded fastener from the anchor, this action will not also cause the anchor to unscrew from the wall and thereby prevent withdrawal of the fastener therefrom.

Also an object of the invention is to provide an anchor of the above type whose drill section, when forcibly engaged by the tip of the threaded fastener as it is being advanced into the shank section, is caused to split open or break off to permit further advance of the fastener, whereby the length of the fastener used may greatly exceed that of the shank section.

Yet another object of this invention is to provide an anchor of the above type whose shank section has a tapered root having convoluted threading thereon whose crests are of essentially the same diameter along substantially the full length of the shank section, whereby as the anchor is turned into a wall of friable material, the resultant particles are then packed by the threading into a relatively dense mass which surrounds the shank to enhance its resistance to withdrawal from the wall.

Still another object of the invention is to provide a plastic anchor which is fabricated of high strength material and which can be manufactured at relatively low cost.

Briefly stated, these objects are attained in a self-drilling plastic anchor installable in a wall by means of a screwdriver, the anchor being adapted to receive a threaded fastener that serves to hold a fixture or other object against the wall. The anchor includes an externally-threaded shank section having an enlarged head that is engageable by the screwdriver. Extending from the lower end of the shank section is a drill section that terminates in a point that lies on the longitudinal axis of the anchor. When the anchor is applied to the wall, the point penetrates its surface, so that the anchor may then be turned by the screwdriver about the point.

The drill section is formed by a pair of cutting blades on opposite sides of the anchor axis and a pair of guide blades each at right angles to a respective cutting blade. When the anchor is turned in, the cutting blades guided by the guide blades proceed to bore a hole in the wall, and when the shank section enters the hole, its bank is tapped by the threading of the shank section until the head thereof engages the surface of the wall to complete the installation. The fastener may then be screwed into the hollow shank section. The undersurface of the head has ratchet teeth formed therein which when the head engages the wall surface, the teeth grip this surface to resist turning out of the anchor.

BRIEF DESCRIPTION OF DRAWINGS

For a better understanding of the invention as well as other objects and further features thereof, reference is made to the following detailed description to be read in conjunction with the accompanying drawings, wherein:

FIG. 6 shows the installed anchor with a fastener whose length is such as to split open the drill section;

FIG. 7 is the same as FIG. 6 except that in this instance, the fastener acts to break off the drill section;

FIG. 8 shows the anchor with the same fastener as in FIG. 6 in which it splits open the drill section, this anchor being installed in a double wall.

DETAILED DESCRIPTION OF INVENTION

The Basic Anchor

Figure 1:
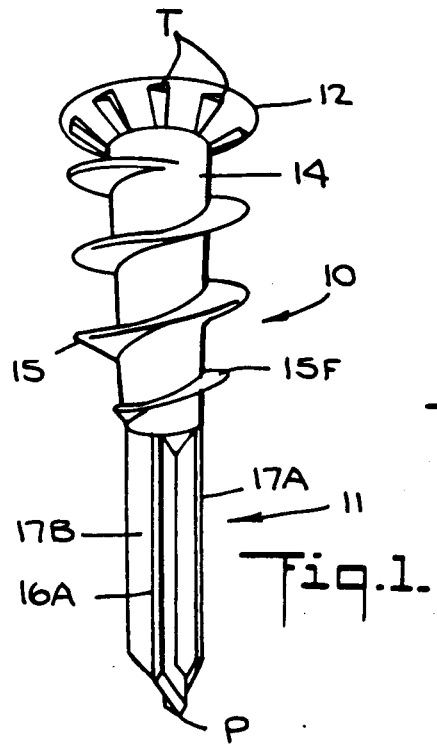
FIG. 1 is a perspective view of a self-drilling anchor in accordance with the invention.
Figure 3:
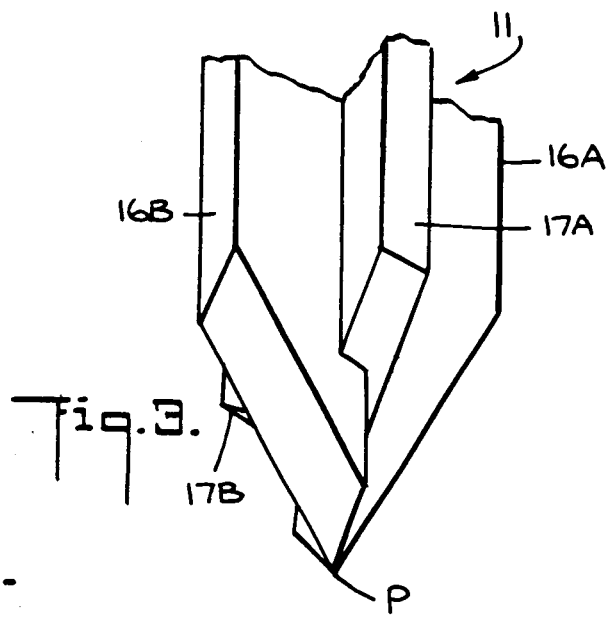
FIG. 3 is a magnified perspective view of the point portion of the drill section of the anchor.
Figure 2:
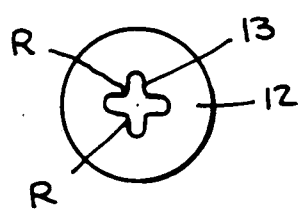
FIG. 2 is a top view of the anchor.

Referring now to FIGS. 1 to 4, there is illustrated in these figures a self-drilling anchor in accordance with the invention, the anchor being molded of synthetic plastic material and having a hollow shank section 10 and a drill section 11 integral therewith.

The synthetic plastic material from which the anchor is molded must be of high strength, and when formed to create a sharp edge, this edge must be capable of cutting the material of the hollow wall in which the anchor is installed. The wall is made of plasterboard, sheet rock, fiberboard and any other material used in hollow wall construction. This material is usually friable; that is to say, it is easily crumbled, and the anchor for this wall must take this into account.

Preferably, the anchor is molded of nylon reinforced with long glass fibers (about 30% by weight) to provide a composite which is ductile and therefore moldable at low cost. The fiberglass constituent of the composite affords the strength and rigidity required of the anchor and also effective cutting edges for the drill section. In practice, the composite material possesses a natural or neutral color that will blend with the surface color of the hollow wall.

Hollow shank section 10 is adapted to receive an externally-threaded fastener or mounting screw to hold a bracket, a fixture, a board or any other object having a mounting hole against the surface of the wall in which the anchor is installed. The length of the fastener is appropriate to the thickness of the object to be held.

Shank section 10 has at its upper end an enlarged head 12 or flange in a low-profile, truncated conical formation. When the anchor is installed in a hollow wall of plasterboard or other relatively soft material, head 12 will then sink into the wall and lie flush against its surface.

Formed on the underside of head 12 is a radial array of ratchet teeth T whose triangular geometry is such that when the anchor is turned clockwise into a wall and the teeth engage its surface, the teeth slip in this direction and do not impede turning, whereas should one thereafter seek to turn out the anchor, the teeth will bite into the wall to resist counterclockwise movement of the anchor. Because of this feature, should the occasion arise when one wishes to unscrew the threaded fastener from an anchor installed in a wall, this action will not at the same time cause the anchor to unscrew from the wall and thereby render it difficult if not impossible to remove the fastener from the anchor.

Because the flange or head 15 is formed of composite nylon material having some degree of flexure, the teeth T on the underside of the head will yield and not cut away the plasterboard or other wall material as the anchor is being screwed into its final position.

An advantage of an anchor whose head lies flush against the wall in which the anchor is installed, apart from the fact that this head does not slightly space the fixture or other object being mounted from the wall, is that if the fixture is later removed from the wall, and one wishes to erase the presence of the anchor, there is no need to remove the anchor. One has only to spackle over the head to provide a clean wall surface.

Shank section 10 has a longitudinal cavity 13 therein having a cruciform formation defining at 90° intervals ridges R extending the length of the shank section. Ridges R which surround the central zone of the cavity are capable of being tapped by the threading of a metal mounting screw or fastener. One may therefore employ in conjunction with the anchor, mounting screws in a limited range of diameters rather than a screw having a predetermined diameter. And as will later be explained, the mounting screw may be much longer than the length of shank section 10, for the drill section yields to permit the screw to more or less extend beyond the shank section to accommodate fixtures or other objects of various thicknesses to be mounted against the wall.

The cruciform formation of the cavity creates a socket in head 15 of shank section 10 adapted to receive the blade of a Phillips-type screwdriver or of a conventional screwdriver which is either manually driven or motor powered.

Shank section 10 has a root 14 which is tapered, whereas the convolutions of the spiral threading 15 which surrounds the root have crests that are of essentially the same diameter for the full length of the section except for the final convolution 15F which is of reduced diameter to merge with drill section 11 and thereby avoid an abrupt transition from drill section 11 to shank section 10.

As pointed out in my above-identified copending patent application, the relationship of the threading to the root is such as to cause material which is easily pulverized, as the shank section is turned into the wall, to form a densified mass surrounding this section to resist withdrawal of the anchor from the wall.

Figure 4:
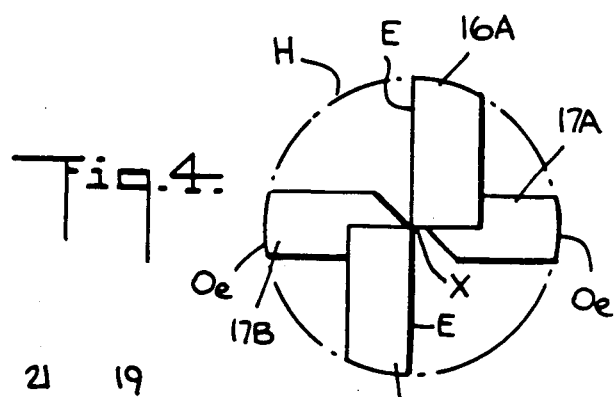
FIG. 4 is a transverse section taken through the drill section of the anchor to show the relationship of the cutting blades to the guide blades.

Drill section 11 is provided with a pair of cutting blades 16A and 16B which, as best seen in FIG. 4, extend in opposite directions from the longitudinal axis X of the anchor so that the planar cutting edges E of these blades are diametrically opposed and act to cut a hole H in the wall when the anchor is turned. At right angles to the respective cutting blades is a pair of guide blades 17A and 17B which engage the bank of hole H to ensure circularity of the hole bored in the wall whereby axis X of the anchor is colinear with the center axis of the hole.

The outer ends $O_e$ of the guide blades are convex to conform to the curvature of the bank of the hole and to sweep the bank as the drill section is turned. In this way, a round hole is bored into the wall, thereby avoiding the tendency of a drill section having a single blade as in the Ernst et al. patent, to cut an oversize or elliptical hole.

The lower ends of the cutting and guide blades 16A, 16B and 17A, 17B are chamfered. The lower ends of the cutting blades which are somewhat longer than the guide blades define a triangular point P. Thus when the anchor is pressed into the surface of a wall, point P penetrates into the surface. When the anchor is then turned by a torque-producing tool, a hole is bored therein by the cutting blades as guided by the guide blades to ensure the formation of a round hole.

Installation

Figure 5:
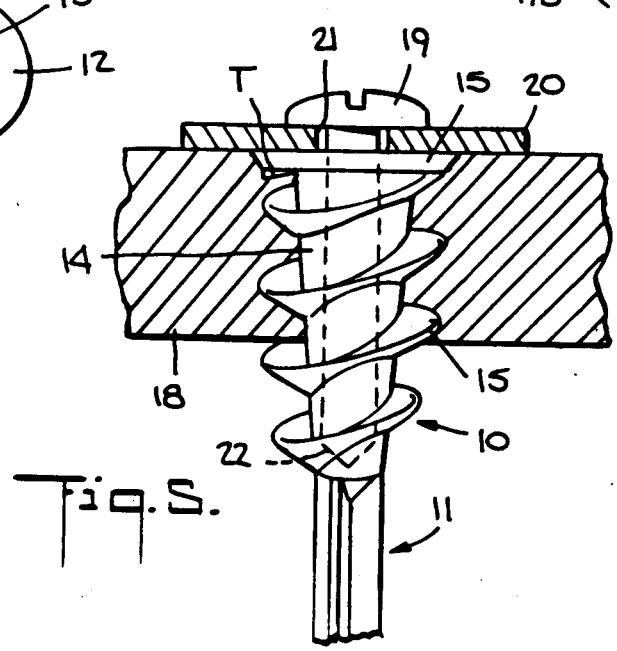
FIG. 5 illustrates the anchor installed in a hollow wall, a threaded fastener being received in the anchor having a length such that it extends the full length of the shank section, but not beyond.

Referring now to FIG. 5, there is shown an anchor in accordance with the invention installed in a hollow wall 18 whose thickness is less than the length of shank section 10 of the anchor, so that a portion of this section extends beyond the inner surface of the wall. It will be seen that low-profile head 15 of the anchor lies flush with the outer surface of the wall and that the teeth T on the undersurface of head 15 are embedded in the wall material to resist turning out of the anchor.

Received in the hollow of shank section 10 is a mounting screw 19 which holds a fixture 20 against the surface of the wall, fixture 20 having a mounting hole 21 to admit the screw. The length of mounting screw 19 is such that its tip is received in a conical well 22 at the lower end of the cavity in hollow shank section 10 just above the drill section. In practice, the cavity may be internally-threaded to receive the mounting screw or it may be unthreaded so that as the mounting screw is turned into the cavity, it taps its way therethrough.

Because mounting screw 19 fits into the cavity of the shank section and does not, when fully turned in, go beyond this section, the integrity of drill section 11 is maintained in the arrangement shown in FIG. 5.

However, in the anchor installation shown in FIG. 6, use is made of a much longer mounting screw 23 which when turned into shank section 10 forces its way beyond the well at the lower end of the cavity and in doing so splits open drill section 11 to permit the mounting screw to exit from the shank section. Since the drill section has already carried out its drilling function, the disruption of the drill section after drilling is performed does not interfere with the installation of the anchor. And since the split drill section is outside of the wall, it does not affect the holding power of the anchor.

It is to be noted that no notch or indentation is required in the anchor to facilitate the exit of the mounting screw from the shank section, for the tip of the advancing mounting screw enters the conical well in the shank section cavity and then strikes the drill section at its center to effect a splitting action in which the two cutting blades and their associated guide blades assume a V formation.

In the anchor shown in FIG. 7, when mounting screw 23 is turned into shank section 10, drill section 11, instead of being split as in FIG. 6, is broken off or laterally displaced from the shank section. To facilitate this action, the anchor need not be provided with annular grooves or notches at the junction of the shank and drill sections, for the natural weakness of this junction causes the drill section to break off when a force is applied to this junction by the advancing mounting screw, thereby permitting the mounting screw to exit from the shank section. In practice, the strength of the bridge between the cutting blades of the drill section will determine when this section will split open and triangulate or break off.

In FIG. 8, the anchor is installed in a double wall formed by wall 18 superposed on a wall 18' of the same thickness. Hence in this instance, shank section 10, when the anchor is installed, does not extend beyond the hollow wall but is fully embedded therein. As a consequence, when drill section 10 is split open into a V formation, the apex portion of the V is lodged in wall 18" and the wings of the V act as a toggle to resist withdrawal of the anchor from the walls. Thus in a double-wall installation which is often used in a high quality commercial construction, an anchor in accordance with the invention affords enhanced holding power.

While there has been shown and described preferred embodiments of a self-drilling wall anchor in accordance with the invention, it will be appreciated that many changes and modifications may be made therein without, however, departing from the essential spirit thereof. Thus the shank section need not have a tapered root but may be cylindrical.

I claim:

1. A self-drilling anchor formed of synthetic plastic material and installable by means of a screwdriver in a hollow wall, said anchor comprising:
   (a) a shank section provided at its upper end with an enlarged head adapted to receive said screwdriver for turning the anchor into the wall, said shank section having a tapered root, a spiral threading surrounding the root and having convolutions whose crests are of essentially the same diameter along substantially the full length of the root, and a cavity extending along the longitudinal axis of the anchor adapted to accommodate a threaded fastener for holding an object against the outer surface of the wall; and
   (b) a drill section attached to the lower end of the shank section and extending therefrom along said axis, said drill section having a pair of cutting blades on opposite sides of said axis and a pair of guide blades each angled relative to a respective cutting blade, whereby as the anchor is turned into the wall by the screwdriver, the cutting blades then bore a round hole whose bank is engaged by the guide blades to ensure circularity of the hole, and as the anchor continues to turn, the shank section enters the hole whose bank is then tapped by the threading until the head engages the outer surface of the wall to complete the anchor installation.

2. A self-drilling anchor formed of synthetic plastic material and installable by means of a screw-driver in a hollow wall, said anchor comprising:
   (a) a shank section provided at its upper end with an enlarged head adapted to receive said screw-driver for turning the anchor into the wall, said shank section having a root, a spiral threading surrounding the root and a cavity extending along the longitudinal axis of the anchor adapted to accommodate a threaded fastener for holding an object against the outer surface of the wall; and
   (b) a drill section attached to the lower end of the shank section and extending therefrom along said axis, said drill section having a pair of cutting blades on opposite sides of said axis and a pair of guide blades each angled relative to a respective cutting blade, whereby as the anchor is turned into the wall by the screwdriver, the cutting blades then bore a round hole whose bank is engaged by the guide blades to ensure circularity of the hole, and as the anchor continues to turn, the shank section enters the hole whose bank is then tapped by the threading until the head engages the outer surface of the wall to complete the anchor installation.

3. An anchor as set forth in claim 2, formed of nylon reinforced by glass fibers.

4. An anchor as set forth in claim 2, wherein said cutting blades are chamfered at their lower ends to form a triangular point which when pressed into the outer surface of the wall punctures this surface whereby the cutting blades then turn about the point.

5. An anchor as set forth in claim 2, wherein the guide blades are provided with convex ends which conform to the curvature of the bank of the hole.

6. An anchor as set forth in claim 2, wherein said cavity has a cruciform cross section which defines a socket in the head of the shank section adapted to receive the blade of a Phillips screwdriver.

7. An anchor as set forth in claim 6, wherein the cruciform cross section of the cavity defines ridges in the root of the shank section which are tapped by the threaded fastener received in the cavity.

8. An anchor as set forth in claim 2, wherein said head has a low profile, truncated conical form whereby when the head engages the outer surface of the wall and is pressed therein, it lies flush with this surface.

9. An anchor as set forth in claim 2, wherein the underside of the head is provided with a radial array of ratchet teeth which when the head is turned clockwise slip over the wall surface, but when the head is turned counterclockwise, bite into the wall to resist this motion.

10. An anchor as set forth in claim 9, wherein said root is tapered and said threading has convolutions whose crests are of essentially the same diameter along substantially the full length of the root.

11. An anchor as set forth in claim 2, wherein said cavity terminates in a well at the base of the root which when the fastener is turned into the cavity receives the tip of the fastener, the length of the fastener being greater than the length of the shank section whereby a further advance of the fastener beyond the well causes the drill section to yield to permit exit of the fastener.

12. An anchor as set forth in claim 11, wherein further advance of the fastener causes the drill section to split open to permit the fastener to exit from the shank section.

13. An anchor as set forth in claim 12, wherein the split open drill section defines the wings of a V which function as a toggle to resist withdrawal of the installed anchor from the wall.

14. A self-drilling anchor installable by a screwdriver into a hollow wall and adapted to receive a screw to fasten an object against the wall, said anchor comprising:
(a) a hollow, tapered shank section for accommodating the screw and having an exterior spiral threading, said shank section being provided at its upper end with a head adapted to receive the screwdriver for turning the anchor into the wall; and
(b) a drill section attached to the shank section at its lower end to form a junction therewith which resists the passage of the screw beyond the shank section, said drill section having at least one cutting blade adapted to bore a hole in the wall as the anchor is turned by the screwdriver.

15. A self-drilling anchor formed of synthetic plastic material and installable by means of a screwdriver in a hollow wall, said anchor comprising:
(a) a shank section provided at its upper end with an enlarged head adapted to receive said screwdriver for turning the anchor into the wall, said shank section having a tapered root, a spiral threading surrounding the root and having convolutions whose crests are of essentially the same diameter along substantially the full length of the root, and a cavity extending along the longitudinal axis of the anchor adapted to accommodate a threaded fastener for holding an object against the outer surface of the wall; and
(b) a drill section attached to the lower end of the shank section and extending therefrom along said axis, said drill section including at least one cutting blade adapted to bore a hole in the wall as the anchor is turned by the screwdriver.

16. A self-drilling anchor formed of synthetic plastic material and installable in a hollow wall, said anchor comprising:
(a) a shank section provided at its upper end with a low profile, enlarged head adapted to receive a screwdriver for turning the anchor into the wall, the head having ratchet teeth on its underside which when the head is turned engage the surface of the wall and slip over this surface, but when the head is turned counterclockwise bit into the wall to resist this motion; and
(b) a drill section attached to the lower end of the shank section and extending axially therefrom, said drill section including at least one cutting blade adapted to bore a hole in the wall as the anchor is turned by the screwdriver, said anchor being molded of nylon reinforced by fiberglass which forms a sharp edge in said cutting blade.

17. A self-drilling anchor installable by means of a tool in a hollow wall, said anchor comprising:
(a) a shank section provided at its upper end with an enlarged head adapted to receive said tool for turning the anchor into the wall, said shank section having a root, a spiral threading surrounding the root and a cavity extending along the longitudinal axis of the anchor adapted to accommodate a fastener for holding an object against the outer surface of the wall; and
(b) a drill section attached to the lower end of the shank section and extending therefrom along said axis, said drill section having a pair of cutting blades on opposite sides of said axis and guide blades angled relative to said cutting blades, whereby as the anchor is turned into the wall by the tool, the cutting blades then bore a round hole whose bank is engaged by the guide blades to ensure circularity of the hole, and as the anchor continues to turn, the shank section enters the hole whose bank is then tapped by the threading until the head engages the outer surface of the wall to complete the anchor installation.

* * * * *

UNITED STATES PATENT AND TRADEMARK OFFICE
CERTIFICATE OF CORRECTION

PATENT NO. : 5,039,262

DATED : August 13, 1991

INVENTOR(S) : Louis N. Giannuzzi

It is certified that error appears in the above-identified patent and that said Letters Patent is hereby corrected as shown below:

Column 10, line 17, "bit" should read --bite--.

Signed and Sealed this

Eleventh Day of May, 1993

Attest:

MICHAEL K. KIRK

*Attesting Officer*   *Acting Commissioner of Patents and Trademarks*